(12) United States Patent
Nakamura

(10) Patent No.: US 9,187,353 B2
(45) Date of Patent: Nov. 17, 2015

(54) METHOD OF TREATING TREATMENT OBJECT CONTAINING HARMFUL COMPOUND

(71) Applicant: Nippon Sheet Glass Company, Limited, Tokyo (JP)

(72) Inventor: Koichiro Nakamura, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 196 days.

(21) Appl. No.: 13/847,117

(22) Filed: Mar. 19, 2013

(65) Prior Publication Data

US 2013/0248452 A1    Sep. 26, 2013

(30) Foreign Application Priority Data

Mar. 21, 2012  (JP) ................................. 2012-064439

(51) Int. Cl.
*C02F 1/70*  (2006.01)
*B09C 1/08*  (2006.01)
(Continued)

(52) U.S. Cl.
CPC ..... *C02F 1/70* (2013.01); *B09C 1/08* (2013.01); *C02F 9/00* (2013.01); *B01J 20/3441* (2013.01); *C02F 1/281* (2013.01); *C02F 1/32* (2013.01);
(Continued)

(58) Field of Classification Search
CPC .............. C02F 1/70; C02F 9/00; C02F 1/281; C02F 1/32; C02F 2305/10; C02F 2101/103; C02F 2101/106; C02F 2101/30; C02F 2101/306; C02F 2303/16; B09C 1/08; B01J 20/3441

USPC ............ 210/673, 675, 676, 691, 748.14, 757; 588/319, 402, 407

See application file for complete search history.

(56) References Cited

U.S. PATENT DOCUMENTS

| 2,087,157 | A | * | 7/1937 | Lind ................................. 141/2 |
| 5,580,461 | A | * | 12/1996 | Cairns et al. .................. 210/673 |
| 5,730,884 | A | * | 3/1998 | Kikuchi .................. 210/748.09 |
| 2005/0044991 | A1 | * | 3/2005 | Guo et al. ........................ 75/721 |

(Continued)

FOREIGN PATENT DOCUMENTS

| JP | 2005-254100 | 9/2005 |
| JP | 2006-280999 | 10/2006 |
| JP | 2009-112403 | 5/2009 |

OTHER PUBLICATIONS

Xu et al, Adsorption and Photocatalyzed Oxidation of Methylated Arsenic Species in TiO2 Suspensions, Aug. 2007, Environmental Science and Technology, vol. 41, No. 14, pp. 5471-5477.*

(Continued)

*Primary Examiner* — Matthew O Savage
(74) *Attorney, Agent, or Firm* — Hamre, Schumann, Mueller & Larson, P.C.

(57) ABSTRACT

Disclosed is a method of treating a treatment object containing a harmful compound. The method includes: a step A of bringing a treatment object containing a harmful compound containing an element X that is As, Sb or Se into contact with titanium oxide so as to adsorb the harmful compound on the surface of the titanium oxide; a step B of separating, from the treatment object, the titanium oxide on which the harmful compound is adsorbed; and a step C of irradiating the titanium oxide separated from the treatment object with light in a treatment phase containing a radical source so as to cause a reaction between the harmful compound adsorbed on the titanium oxide and a radical generated from the radical source and detoxify the harmful compound.

7 Claims, 5 Drawing Sheets

(51) Int. Cl.
*C02F 9/00* (2006.01)
*B01J 20/34* (2006.01)
*C02F 1/28* (2006.01)
*C02F 1/32* (2006.01)
*C02F 1/72* (2006.01)

(52) U.S. Cl.
CPC ............... *C02F 1/72* (2013.01); *C02F 2303/16* (2013.01); *C02F 2305/10* (2013.01); *Y02W 10/37* (2015.05)

(56) References Cited

U.S. PATENT DOCUMENTS

2006/0091079 A1* 5/2006 Meng et al. .................. 210/688
2010/0305386 A1 12/2010 Nakamura

OTHER PUBLICATIONS

Miller et al, Optimization of capacity and kinetics for a novel bio-based arsenic sorbent, TiO2-impregnated chitosan bead., Sep. 2011, Water Research, 45(2011) 5745-5754.*

* cited by examiner

METHOD OF TREATING TREATMENT OBJECT CONTAINING HARMFUL COMPOUND

BACKGROUND OF THE INVENTION

1. Field of the Invention

The present invention relates to methods of treating treatment objects containing harmful compounds. More specifically, the present invention relates to a method of treating treatment objects such as soil and water contaminated with harmful compounds containing arsenic (As), antimony (Sb) or selenium (Se).

2. Description of Related Art

The toxicity of an arsenic compound depends greatly on its type. Inorganic arsenic compounds typified by arsenious acid are highly toxic, while organic arsenic compounds are relatively less toxic. Inorganic arsenic compounds are methylated in human bodies and eliminated therefrom. This reaction is considered as a detoxification mechanism of living bodies.

Various methods have been proposed to detoxify inorganic arsenic compounds in the environment. The present inventor also has proposed a detoxification method for inorganic arsenic compounds using titanium oxide as a photocatalyst (JP 2009-112403 A). In this method, acetic acid, methanol, or the like is used as the source of radicals such as methyl radicals. Photocatalytic action of titanium oxide causes inorganic arsenic compounds to react with methyl radicals, etc. and to be converted into organic arsenic compounds such as dimethylarsonic acid (DMA) and arsenobetaine (AsB).

SUMMARY OF THE INVENTION

The toxicity of compounds classified as organic arsenic compounds also varies from one to another. For example, the results of cytotoxicity tests show that dimethylarsonic acid is slightly toxic although it is less toxic than arsenious acid or the like, while arsenobetaine is non-toxic. Dimethylarsonic acid, which is also known as cacodylic acid, has been used as an ingredient of herbicides. Therefore, a significant amount of dimethylarsonic acid remains in the soil in some regions of the world. Under these circumstances, dimethylarsonic acid has been identified as a carcinogen, and the safety of drinking water contaminated with dimethylarsonic acid leached from the soil has become an issue. There are health risks associated with organic arsenic compounds in many countries including the United States where a significant amount of dimethylarsonic acid remains in cotton fields, orchards, golf courses, etc.

There is apparently a growing need for detoxification treatment of low-toxic harmful compounds typified by dimethylarsonic acid. However, to date, there has been no known feasible treatment method that meets the need. In particular, there is no prospect of developing a method suitable for the treatment of harmful compounds contained in a treatment object such as soil which is present in abundance and is very costly to transport for the treatment. A treatment object such as drinking water requires its own treatment process suitable for the intended use, which limits the choice of treatment methods used therefor. For example, in order to apply the method disclosed in JP 2009-112403 A to the treatment of harmful compounds contained in drinking water, acetic acid or the like as a radical source has to be supplied to the treatment object, which causes deterioration of the drinking water.

In view of the above circumstances, it is an object of the present invention to propose a novel treatment method suitable for detoxifying harmful compounds.

The present invention provides a method of treating a treatment object containing a harmful compound. The method includes: a step A of bringing a treatment object containing a harmful compound containing an element X that is As, Sb or Se into contact with titanium oxide so as to adsorb the harmful compound on a surface of the titanium oxide; a step B of separating, from the treatment object, the titanium oxide on which the harmful compound is adsorbed; and a step C of irradiating the titanium oxide separated from the treatment object with light in a treatment phase containing a radical source so as to cause a reaction between the harmful compound adsorbed on the titanium oxide and a radical generated from the radical source and detoxify the harmful compound.

In its embodiments, the present invention can provide the following advantageous effects, which have not been achieved by conventional treatment methods. According to an embodiment of the present invention, it is possible to selectively detoxify a low-toxic harmful compound typified by dimethylarsonic acid. According to another embodiment of the present invention, it is possible to detoxify, at low cost, a harmful compound contained in a treatment object such as soil which is present in abundance and is very costly to transport. According to still another embodiment of the present invention, it is possible to treat a harmful compound contained in a treatment object typified by drinking water which should be protected from deterioration, while preventing unacceptable deterioration of the treatment object.

DETAILED DESCRIPTION OF THE INVENTION

Figure 1:
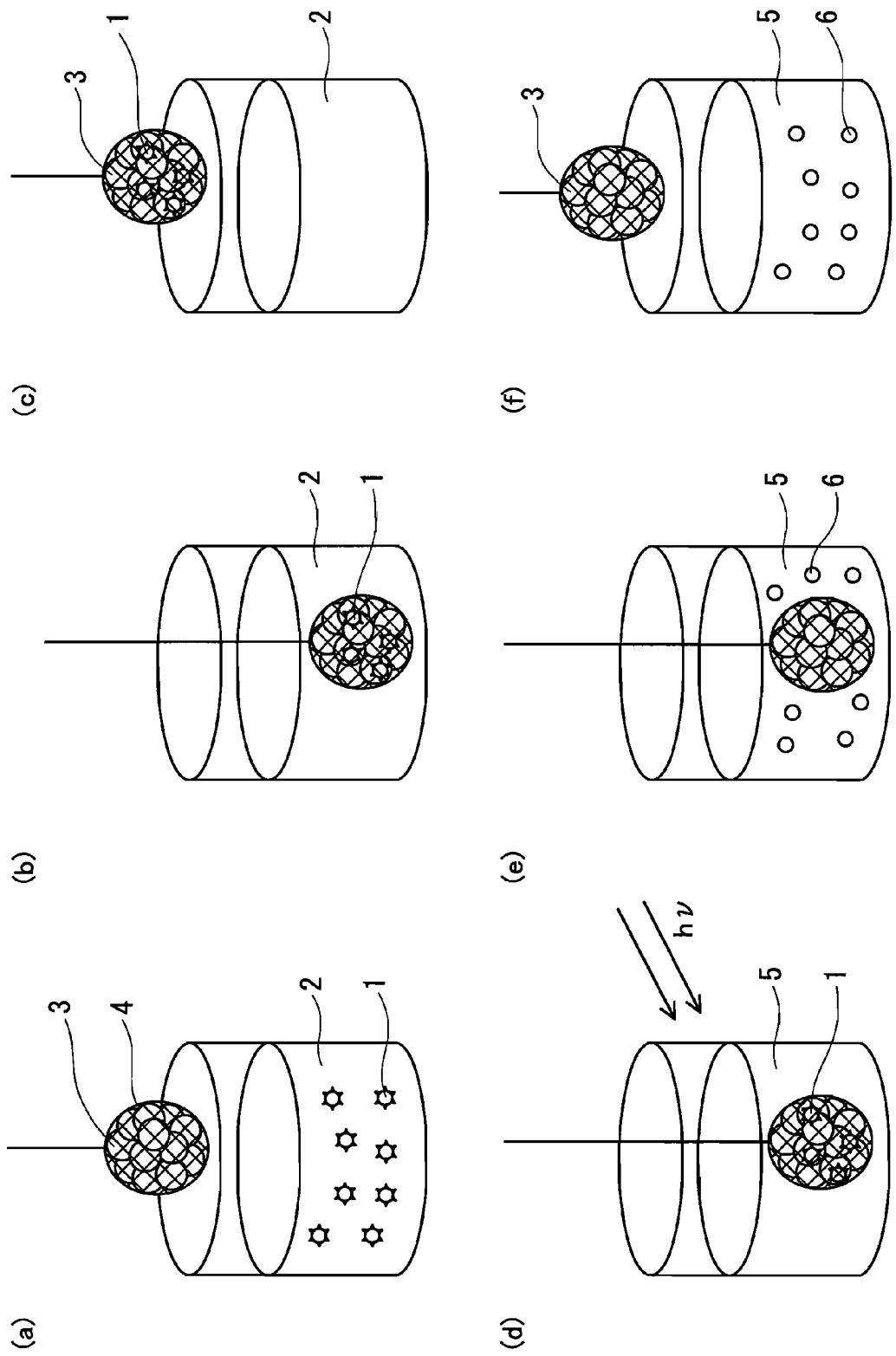
FIG. 1 is a schematic diagram showing an example of a batch treatment method step by step.

The present inventor has conducted studies focusing on the difference between the affinity of a toxic harmful compound for the surface of titanium oxide and the affinity of a detoxified compound for the surface of titanium oxide, and as a result, has accomplished the present invention. Hereinafter, embodiments of the present invention are described taking arsenic compounds as examples.

Not only highly toxic inorganic arsenic compounds such as arsenious acid and arsenic acid but also low toxic organic arsenic compounds such as monomethylarsonic acid (MMA) and dimethylarsonic acid (DMA) contain a hydroxyl group(s). In contrast, non-toxic organic arsenic compounds such as trimethylarsonic acid (TMAO) and arsenobetaine (AsB) contain no hydroxyl group. On the other hand, hydroxyl groups represented by Ti—OH are also present on the surface of titanium oxide. Therefore, toxic arsenic compounds have higher affinity for the surface of titanium oxide than non-toxic arsenic compounds. Taking advantage of this difference in affinity, titanium oxide can be used as an adsorbent for selectively adsorbing a toxic arsenic compound in a treatment object thereon. It is possible to detoxify the toxic arsenic compound selectively and efficiently by separating, from the treatment object, the titanium oxide on which the harmful arsenic compound to be treated is adsorbed, in other words, by moving the harmful arsenic compound away from the other arsenic compounds contained in the treatment object, and then irradiating that titanium oxide with light.

The cost required for the treatment of a toxic arsenic compound contained in soil or waste water is an important factor in selecting the treatment method. According to the present embodiment, there is no need to transport the soil itself or disperse a large amount of radical source material on the soil because it is only necessary to, for example, disperse titanium oxide on the soil in a recoverable form so as to adsorb the toxic arsenic compound on the titanium oxide and then transport only the recovered titanium oxide to a treatment facility. Therefore, treatment of arsenic compounds can be achieved at low cost. Such a low-cost treatment can be applied not only to soil but also to waste water containing traces of a toxic arsenic compound.

It is possible to detoxify a toxic arsenic compound without deteriorating water such as drinking water, industrial water or agricultural water by applying the present embodiment to such water. For example, in order to detoxify traces of a toxic arsenic compound contained in drinking water, it is only necessary to bring the drinking water into contact with titanium oxide in a treatment vessel to adsorb the toxic arsenic compound on the titanium oxide, and then discharge the drinking water outside the treatment vessel and supply a treatment phase (treatment liquid) containing a radical source into the treatment vessel. The toxic arsenic compound is thus detoxified in this treatment vessel, and therefore, there is no need to add a radical source such as acetic acid to the drinking water. As a result, the arsenic compound can be treated without deteriorating the treatment object.

Since toxic arsenic compounds have higher affinity for the surface of titanium oxide than non-toxic arsenic compounds, the arsenic compound that has been reacted with radicals by the photocatalytic action of titanium oxide and thus detoxified tends to be desorbed from the surface of the titanium oxide. Therefore, the detoxified arsenic compound is diffused into the treatment phase containing the radical source material rather than remaining on the surface of titanium oxide. This means that the surface of the titanium oxide is again ready to adsorb toxic arsenic compounds thereon. No special treatment is required to remove the detoxified arsenic compounds from the titanium oxide for the repeated use thereof.

The present invention may be embodied as a so-called batch treatment method or a continuous treatment method. Hereinafter, an embodiment of the batch treatment method and that of the continuous treatment method are described respectively.

(Batch Treatment Method)

The embodiment of the batch treatment is described with reference to FIG. 1.

<Step A>

In the step A, a harmful compound containing an element X that is As, Sb or Se is brought into contact with titanium oxide so as to adsorb the harmful compound on the surface of the titanium oxide. As shown in FIG. 1(a) and (b), in the embodiment of the batch treatment, the step A is performed as a step A1 of supplying a holder 4 to a treatment object 2 so as to adsorb a harmful compound 1 on the surfaces of titanium oxide particles 3. The holder 4 has an interior space isolated from outside by a barrier and holds the titanium oxide particles 3 as the titanium oxide in the interior space. The barrier prevents passage of the titanium oxide particles 3 and allows passage of the harmful compound 1 and a radical source. A wire mesh or net may be used as the barrier. As shown in FIG. 1(b), the harmful compound 1 contained in the treatment object 2 is adsorbed on the surfaces of the titanium oxide particles 3 and concentrated thereon.

In the step A, it is desirable to stir the treatment object 2 to promote the adsorption of the harmful compound onto the surfaces of the titanium oxide particles 3. In the case where the treatment object 2 is a liquid such as drinking water, it can be stirred easily, and any type of stirrer may be used therefor. In the case where the treatment object 2 is soil, it is only necessary to disperse the holders 4 on the soil and then stir the soil while watering the soil when appropriate. For example, a mixer may also be used in the area where the soil to be treated is present so as to mix the holders 4 and the soil.

<Step B>

In the step B, the titanium oxide on which the harmful compound is adsorbed is separated from the treatment object. As shown in FIG. 1(c), in the embodiment of the batch treatment, the step B is performed as a step B1 of moving the holder 4 away from the treatment object 2. The harmful compound is removed from the treatment object 2 by the separation of the titanium oxide particles 3 from the treatment object 2. Although not shown here, non-toxic compounds containing the element X and having less affinity for titanium oxide (an example of such an arsenic compound is arsenobetaine) remains in the treatment object 2. As just described, in the step A and the step B, only the toxic compound is extracted and removed from the treatment object 2.

After the step B1, the holder 4 is supplied to the treatment phase containing a radical source material to perform the step C.

<Step C>

In the step C, the titanium oxide separated from the treatment object is irradiated with light in the treatment phase containing the radical source so as to cause a reaction between the harmful compound adsorbed on the titanium oxide and a radical generated from the radical source and detoxify the harmful compound. As shown in FIG. 1(d), the titanium oxide particles 3 in the treatment phase 5 are irradiated with light and titanium oxide contained in the titanium oxide particles 3 is excited. Upon contact with the excited titanium oxide, the radical source generates radicals, and these radicals react with the harmful compound. Preferred examples of radicals include methyl radicals ($.CH_3$) and carboxymethyl radicals ($.CH_2CO_2H$).

The number of hydroxyl groups in the harmful compound 1 is reduced by the reaction with the radicals. As shown in FIG. 1(e), a compound 6 that has been detoxified by the removal of hydroxyl groups is desorbed from the titanium oxide particles 3. In the step C, the treatment phase 5 may be stirred to promote the desorption of the detoxified compound 6 from the surfaces of the titanium oxide particles 3.

After the step C is performed, a step D of separating the titanium oxide from the treatment phase may further be performed. As shown in FIG. 1(f), in the embodiment of the batch treatment, the step D is performed as a step D1 of moving the holder 4 holding the titanium oxide particles 3 away from the treatment phase 5. The holder 4 that has been moved away from the treatment phase 5 may be supplied again to the treatment object 2 to perform the steps A to C again in this order.

(Continuous Treatment)

The embodiment of the continuous treatment is described with reference to FIG. 2.

<Step A>

As shown in FIG. 2(a), in the embodiment of the continuous treatment, the step A is a step A2 of supplying a treatment object 12 into the interior space of a treatment vessel 10 so as to adsorb a harmful compound on the surface of titanium oxide. The treatment vessel 10 has an interior space for holding the treatment object 12 and holds the titanium oxide in the interior space. The titanium oxide is held in such a manner as to come into contact with the treatment object 12 to be held in the interior space. Titanium oxide particles 13 are suitable as the titanium oxide also in the present embodiment, but a titanium oxide thin film formed on the surface of a member placed inside the treatment vessel 10 also can be used as the titanium oxide. As shown in FIG. 2(b), a harmful compound 11 contained in the treatment object 12 is adsorbed on the surfaces of the titanium oxide particles 13 and concentrated thereon.

Also in the present embodiment, in the step A, it is desirable to stir the treatment object 12 to promote the adsorption of the harmful compound onto the surfaces of the titanium oxide particles 13. In the present embodiment, the step A2 is performed with the treatment object 12 being held in the treatment vessel 10, but it is also possible to perform the step A2 while discharging the treatment object 12 outside the treatment vessel 10.

<Step B>

Figure 2:
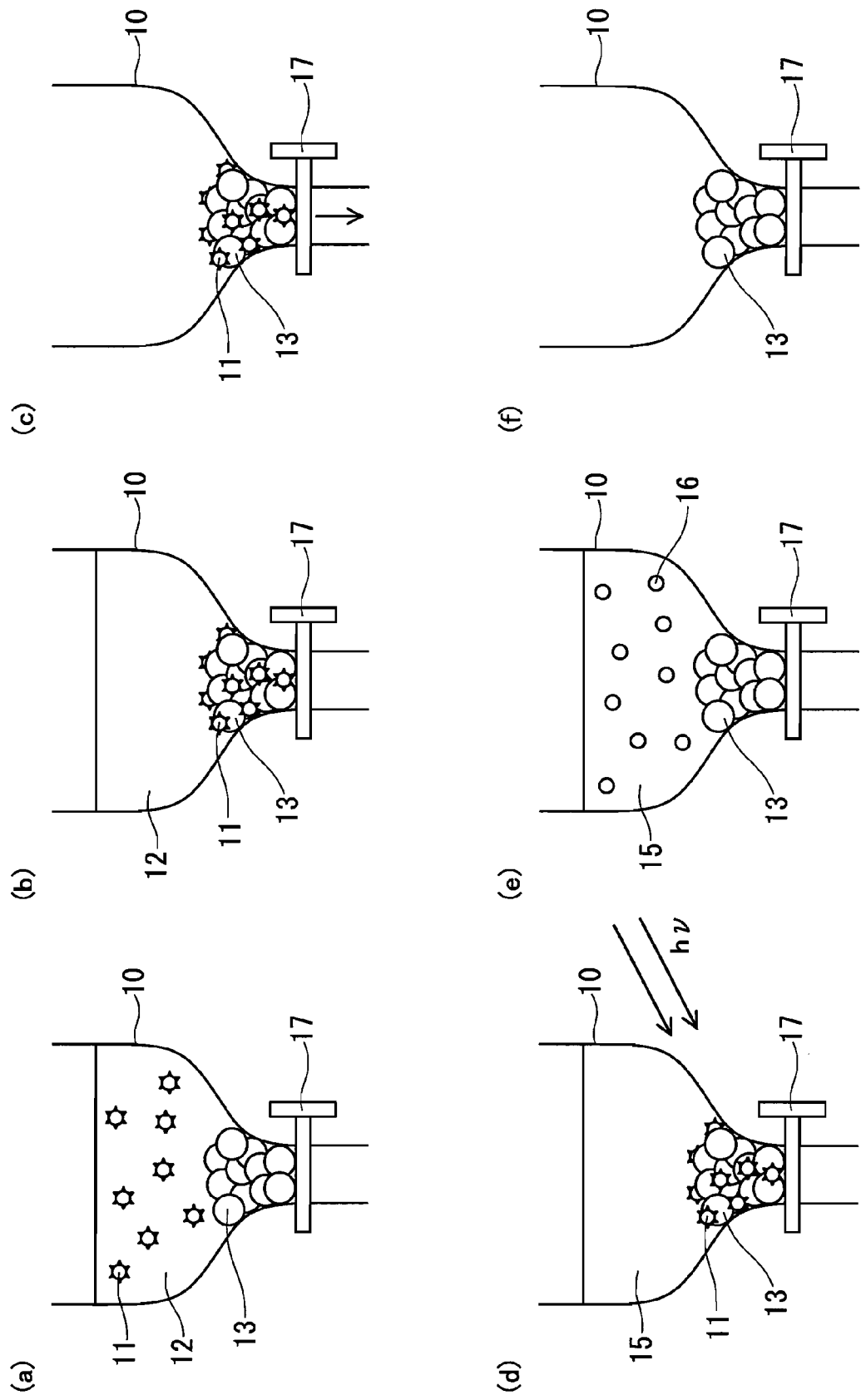
FIG. 2 is a schematic diagram showing an example of a continuous treatment method step by step.

As shown in FIG. 2(c), in the embodiment of the continuous treatment, the step B is a step B2 of discharging the treatment object 12 outside the treatment vessel 10. The harmful compound 1 is separated from the treatment object 12 by the discharge of the treatment object 12 from the treatment vessel 10. In the treatment vessel 2 shown in FIG. 2, a closed cock 17 is opened to discharge the treatment object 12. In the embodiment of the continuous treatment, the step A and the step B can be performed in parallel. In this case, the opening of the cock 17 may be adjusted so that the treatment object 12 be retained in the treatment vessel 10 long enough to adsorb the harmful compound 11 on the surfaces of the titanium oxide particles 13 when discharging the treatment object 12 from the treatment vessel 10 and supplying the treatment object 12 into the treatment vessel 10.

In order to perform the step C after the step B2, a treatment phase 15 containing a radical source material is introduced into the interior space of the treatment vessel 10 with the cock 17 closed.

<Step C>

In the embodiment of the continuous treatment, the step C is performed in the same manner as in the embodiment of the batch treatment. As shown in FIG. 2(d), the titanium oxide particles 13 in the treatment phase 15 are irradiated with light and titanium oxide contained in the titanium oxide particles 13 is excited. Upon contact with the excited titanium oxide, the radical source generates radicals, and these radicals react with the harmful compound. In the embodiment of the continuous treatment, it is also possible to perform the step C while supplying the treatment phase 15 into the treatment vessel 10, while discharging the treatment phase 15 outside the treatment vessel 10, or while supplying and discharging the treatment phase 15 simultaneously.

The number of hydroxyl groups in the harmful compound 1 is reduced by the reaction with the radicals. As shown in FIG. 2(e), a compound 16 that has been detoxified by the removal of hydroxyl groups are desorbed from the titanium oxide particles 13. In the step C, the treatment phase 15 may be stirred to promote the desorption of the detoxified compound 16 from the surfaces of the titanium oxide particles 13.

After the step C is performed, a step D of separating the titanium oxide from the treatment phase may further be performed. As shown in FIG. 2(f), in the embodiment of the continuous treatment, the step D is a step D2 of discharging the treatment phase 15 outside the treatment vessel 10, with the titanium oxide left in the treatment vessel 10. The step D2 is performed by opening the cock 17 again. In order to perform the steps A to C again in this order after the treatment phase 15 is discharged, the treatment object 12 may be supplied again into the treatment vessel 10 with the cock 17 closed. In the case where the treatment object 12 is drinking water or the like, the inside of the treatment vessel 10 may be cleaned before the treatment object 12 is supplied thereinto.

Next, a reaction in which a harmful compound is detoxified is described, taking an arsenic compound as an example of the harmful compound.

Figure 3:
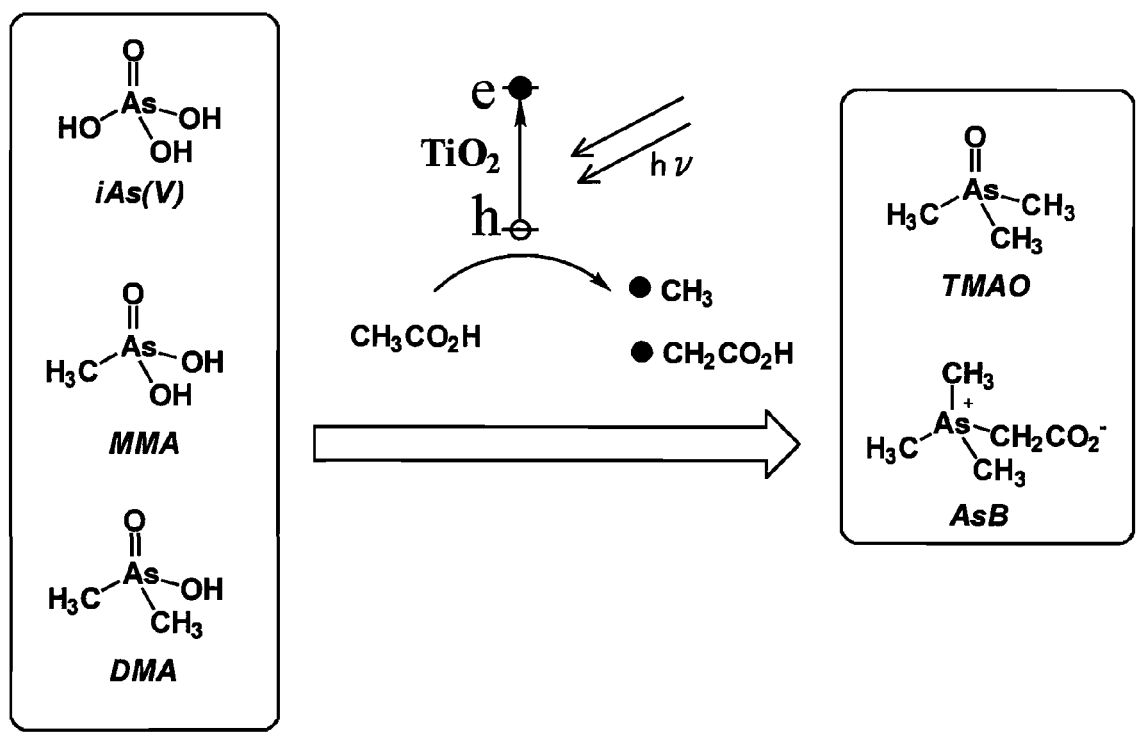
FIG. 3 is a diagram illustrating a detoxification reaction mechanism.

As shown in FIG. 3, toxic inorganic arsenic compounds such as arsenic acid (iAs(V)) and toxic organic arsenic compounds typified by cacodylic acid (DMA) and monomethylarsonic acid (MMA) contain hydroxyl groups directly bonded to arsenic atoms. These toxic arsenic compounds react with radicals generated by the photocatalytic action of titanium oxide ($TiO_2$) and are converted into non-toxic organic arsenic compounds typified by trimethylarsine oxide (TMAO) and arsenobetaine (AsB).

When titanium oxide is irradiated with light, electrons that are covalently bonded with titanium and oxygen transfer from titanium (Ti) to oxygen (O) to form $Ti^{4+}(O^{2-})_2$. $Ti^{4+}(O^{2-})_2$ is highly oxidative and removes electrons from acetic acid as a radical source. Acetic acid is oxidized to methyl radicals and/or carboxymethyl radicals by the removal of electrons.

The radicals thus generated react with the toxic arsenic compounds adsorbed on the surface of titanium oxide. Specifically, methyl radicals and/or carboxymethyl radicals react with As—OH bonds so as to methylate or acetylate As atoms. As a result, non-toxic arsenic compounds such as trimethylarsine oxide and arsenobetaine are generated. Presumably, the presence of As—OH bonds very close to the radicals generated on the surface of titanium oxide contributes to the proceeding of this reaction.

Conventionally, the use of photocatalytic action of titanium oxide has been studied for the purpose of reducing the toxicity of inorganic arsenic compounds (JP 2009-112403 A). However, as far as the present inventor knows, there has been no suggestion to use the photocatalytic action of titanium oxide for the treatment of a treatment object containing toxic organic arsenic compounds.

FIG. 3 shows acetic acid as an example of the radical source, but the radical source is not limited to this. The radical source is, for example, at least one selected from the group consisting of carboxylic acid, aldehyde, and alcohol. Preferred examples of the radical source include acetic acid, methanol, ethanol, formaldehyde, acetaldehyde, propionaldehyde, acetic anhydride, propionic acid, butanoic acid, and formic acid.

FIG. 3 shows arsenic acid (iAs(V)), cacodylic acid (DMA), and monomethylarsonic acid (MMA) as examples of toxic organic arsenic compounds, but organic arsenic compounds that can be detoxified by the reaction mechanism shown in FIG. 3 are not limited to these. In one embodiment of the present invention, the harmful compound contains at least one hydroxyl group, and in the step C, the number of the hydroxyl groups in the harmful compound is reduced by the reaction with the radical. Typically, this hydroxyl group is bonded directly to the element X that is As, Sb or Se. In one embodiment of the present invention, the harmful compound having a hydroxyl group that is bonded directly to the element X is converted, by the reaction with the radical, into a compound containing no hydroxyl group that is bonded directly to the element X.

FIG. 3 shows trimethylarsine oxide (TMAO) and arsenobetaine (AsB) as examples of non-toxic organic arsenic compounds, but non-toxic organic arsenic compounds generated by the reaction mechanism shown in FIG. 3 are not limited to these. As another example of such non-toxic organic arsenic compounds, tetramethylarsonium ion (TeMA) can be mentioned.

FIG. 1 and FIG. 2 show the embodiments in which the treatment objects 2 and 12 are liquids such as waste water and drinking water, but the treatment objects 2 and 12 are not limited to liquids. As described above, the treatment object 2 may be a solid such as soil. The treatment phases 5 and 15 also are not limited to liquids. It is also possible to use a gas phase containing a radical source as the treatment phase 5 or 15. The embodiments in which the element X is As are described so far, but it is obvious, based on the common technical knowledge and the above-described reaction mechanism, that the embodiments thus described can also be implemented when the element X is Sb or Se.

In particular, the step C can be performed with reference to the conditions disclosed in JP 2009-112403 A. For example, in order to promote alkylation, the light intensity is preferably 0.1 mW/cm$^2$ or more and 1000 mW/cm$^2$ or less, and more preferably 1 mW/cm$^2$ or more and 1000 mW/cm$^2$ or less. The light energy to be irradiated is preferably 1 mJ or more and 100 J or less, and further preferably 100 mJ or more and 100 J or less. As the light to be irradiated, ultraviolet light, visible light, near-infrared light, infrared light, far-infrared light, etc. can be used. When visible light-responsive titanium oxide is used as the titanium oxide, sunlight, light emitted from an LED or light emitted from a fluorescent lamp may be used.

The above lights preferably have a range of wavelengths with a center wavelength at which the covalent bonds in the radical source are cleaved. When the radical source is acetic acid, the wavelength range is preferably 185 nm±100 nm or 255 nm±100 nm, and more preferably 185 nm±50 nm or 255 nm±50 nm. Preferably, the light to be irradiated has a range of wavelengths with a center wavelength of 380 nm, which corresponds to the redox potential of titanium oxide (3 eV). This wavelength range is preferably 380 nm±100 nm, and more preferably 380 nm±50 nm.

(Adsorption Test)

1 mL of aqueous solution containing arsenic was prepared. This aqueous solution contained diarsenic trioxide (arsenious acid, iAs(III)), diarsenic pentoxide (arsenic acid (iAs(V)), monomethylarsonic acid (MMA), dimethylarsonic acid (cacodylic acid, DMA), trimethylarsine oxide (TMAO), tetramethylarsonium ion (TeMA), and arsenobetaine (AsB), each at a concentration of 50 µg/L.

Figure 4:
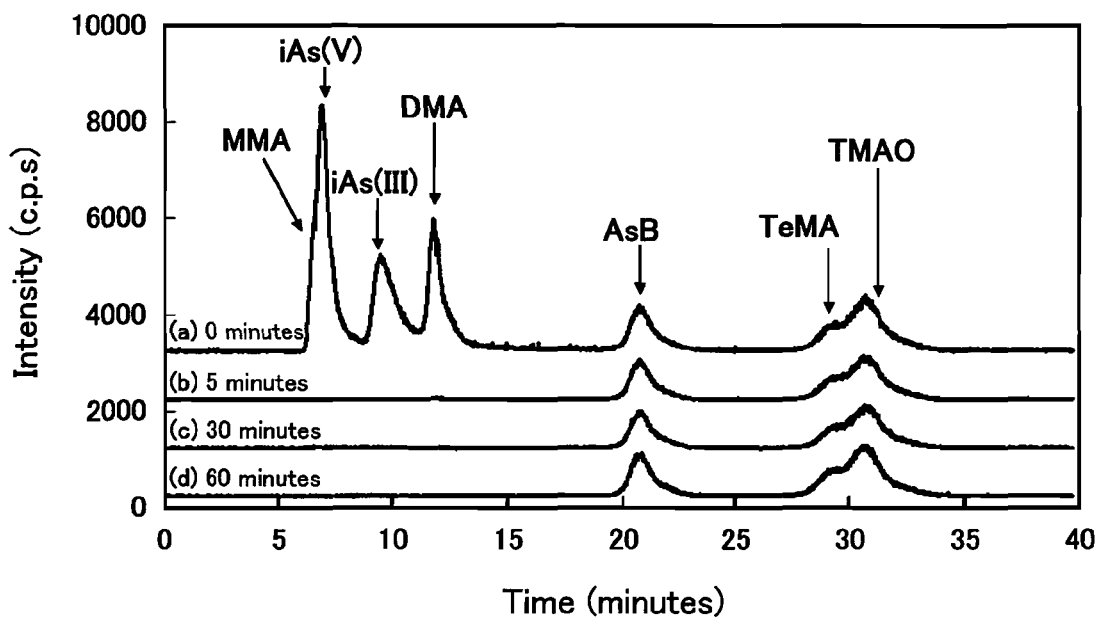
FIG. 4 shows HPLC-ICP-MS chromatograms obtained from an adsorption test with titanium oxide.

Next, 0.01 g of titanium oxide powder (with an average particle size of 100 µm, Kishida Chemical Co., Ltd.) was added to this aqueous solution maintained at 20° C. Then, a portion of the aqueous solution was removed at predetermined times (0, 5, 30 and 60 minutes) after the addition of titanium oxide, with stirring. The removed portions of the aqueous solution were subjected to high-performance liquid chromatography-inductively coupled plasma mass spectrometry (HPLC-ICP-MS) analysis. FIG. 4 shows the resulting chromatograms.

FIG. 4 reveals that the aqueous solution still contained all the added arsenic compounds immediately (0 minutes) after the addition of titanium oxide. However, no clear peaks derived from arsenious acid, arsenic acid, DMA and MMA appeared in the chromatograms obtained after 5 minutes and later. On the other hand, the peaks derived from TMAO, TeMA and AsB remained virtually unchanged even in the chromatograms obtained after 5 minutes and later. These results confirm that TMAO, TeMA and AsB are not substantially adsorbed on titanium oxide, whereas arsenious acid, arsenic acid, DMA and MMA are adsorbed thereon.

(Reaction Test)

Sample solutions A to C (1 mL each) containing the following harmful compounds were prepared. The sample solutions A to C each contain acetic acid at a concentration of 1 mol/L as a radical source.

Figure 5:
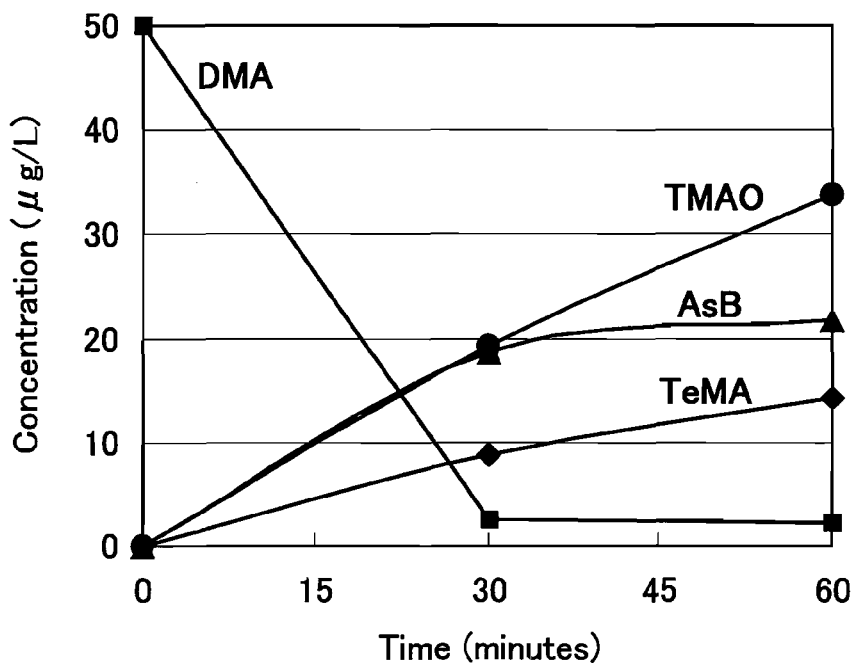
FIG. 5 is a graph showing the results of a reaction test performed on a sample solution containing dimethylarsonic acid (DMA).
Figure 6:
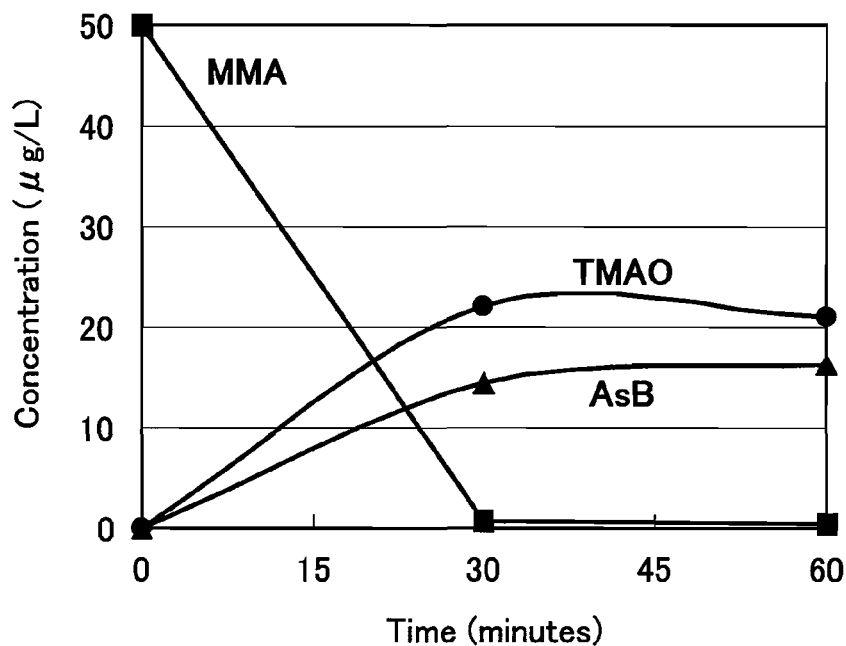
FIG. 6 is a graph showing the results of a reaction test performed on a sample solution containing monomethylarsonic acid (MMA).
Figure 7:
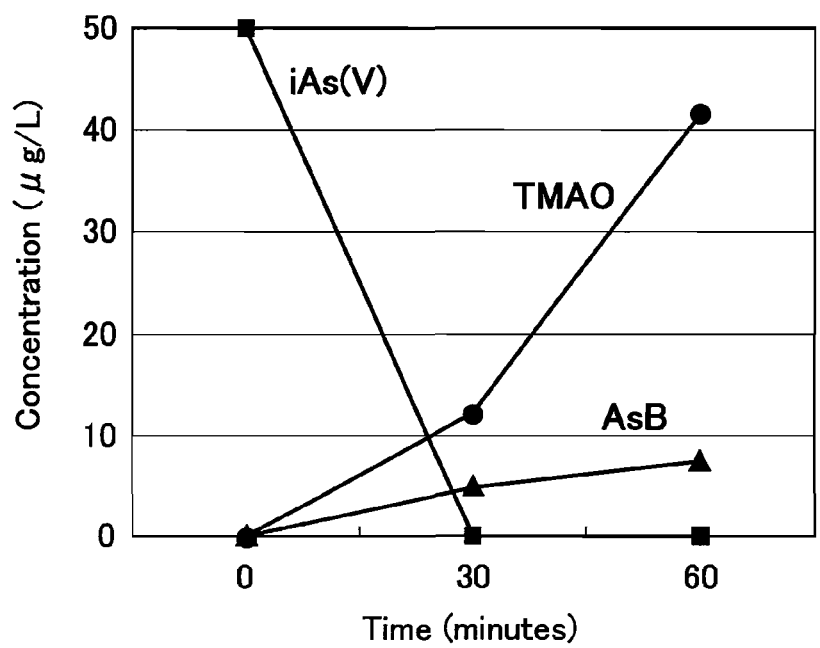
FIG. 7 is a graph showing the results of a reaction test performed on a sample solution containing arsenic acid (iAs (V)).

Sample solution A: aqueous solution of dimethylarsonic acid (DMA) at a concentration of 50 µg/L
Sample solution B: aqueous solution of monomethylarsonic acid (MMA) at a concentration of 50 µg/L
Sample solution C: aqueous solution of arsenic acid (iAs (V)) at a concentration of 50 µg/L 0.1 g of titanium oxide powder (Kishida Chemical Co., Ltd.) was added to each of the sample solutions A to C. A portion of each of these aqueous solutions was removed at predetermined times (0, 30 and 60 minutes) after the addition of titanium oxide, with the titanium oxide in the solution being irradiated with light at an intensity of 300 mW/cm$^2$ using a high-pressure mercury lamp in a 70° C. environment. The removed portions of each aqueous solution were subjected to HPLC-ICP-MS analysis, and the concentration (µg/L) of each harmful compound contained was calculated based on the analysis result. FIG. 5 to FIG. 7 each show the results.

As shown in FIG. 5 to FIG. 7, the concentrations of iAs(V), DMA and MMA decreased by the photocatalytic action of titanium oxide, while the concentrations of non-toxic arsenic compounds such as AsB and TMAO increased. These results confirm that not only inorganic arsenic compounds but also harmful organic arsenic compounds can be detoxified by radicals generated by the photocatalytic action of titanium oxide.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of treating a treatment object containing a harmful compound, the method comprising:
    a step A of bringing a treatment object containing a harmful compound containing an element X that is As, Sb or Se into contact with titanium oxide so as to adsorb the harmful compound on a surface of the titanium oxide;
    a step B of separating, from the treatment object, the titanium oxide on which the harmful compound is adsorbed;
    a step C of irradiating the titanium oxide separated from the treatment object with light in a treatment phase containing a radical source so as to cause a reaction between the harmful compound adsorbed on the titanium oxide and a radical generated from the radical source whereby the harmful compound is detoxified, the detoxified harmful compound diffusing from the titanium oxide into the treatment phase; and
    a step D of separating the titanium oxide from the treatment phase that comprises the detoxified harmful compound, after the step C; wherein the harmful compound contains at least one hydroxyl group, the hydroxyl group is bonded directly to the element X, and in the step C, the harmful compound is converted, by the reaction with the radical, into a compound containing no hydroxyl group that is bonded directly to the element X.

2. The method according to claim 1, wherein after the step D is performed, the step A, the step B, and the step C are performed again in this order using the titanium oxide separated from the treatment phase.

3. The method according to claim 1, wherein the radical source is at least one selected from the group consisting of carboxylic acid, aldehyde, and alcohol.

4. The method according to claim 1, wherein a holder having an interior space isolated from outside by a barrier and holding titanium oxide particles as the titanium oxide in the interior space is used, the barrier preventing passage of the titanium oxide particles and allowing passage of the harmful compound and the radical source.

5. The method according to claim 4, wherein the step A is a step A1 of supplying the holder to the treatment object so as to adsorb the harmful compound on surfaces of the titanium oxide particles, the step B is a step B1 of moving the holder away from the treatment object, and after the step B1, the holder is supplied to the treatment phase to perform the step C.

6. The method according to claim 1, wherein a treatment vessel having an interior space for holding the treatment object and holding the titanium oxide in the interior space is used, the titanium oxide being held in such a manner as to come into contact with the treatment object to be held in the interior space.

7. The method according to claim 6, wherein the step A is a step A2 of supplying the treatment object into the interior space of the treatment vessel so as to adsorb the harmful compound on the surface of the titanium oxide, the step B is a step B2 of discharging the treatment object outside the treatment vessel, and after the step B2, the treatment phase is supplied into the interior space of the treatment vessel to perform the step C.

\* \* \* \* \*